W. R. BECKLEY.
CHEMICAL FILTER.
APPLICATION FILED DEC. 27, 1915.
1,277,832.
Patented Sept. 3, 1918.
2 SHEETS—SHEET 2.
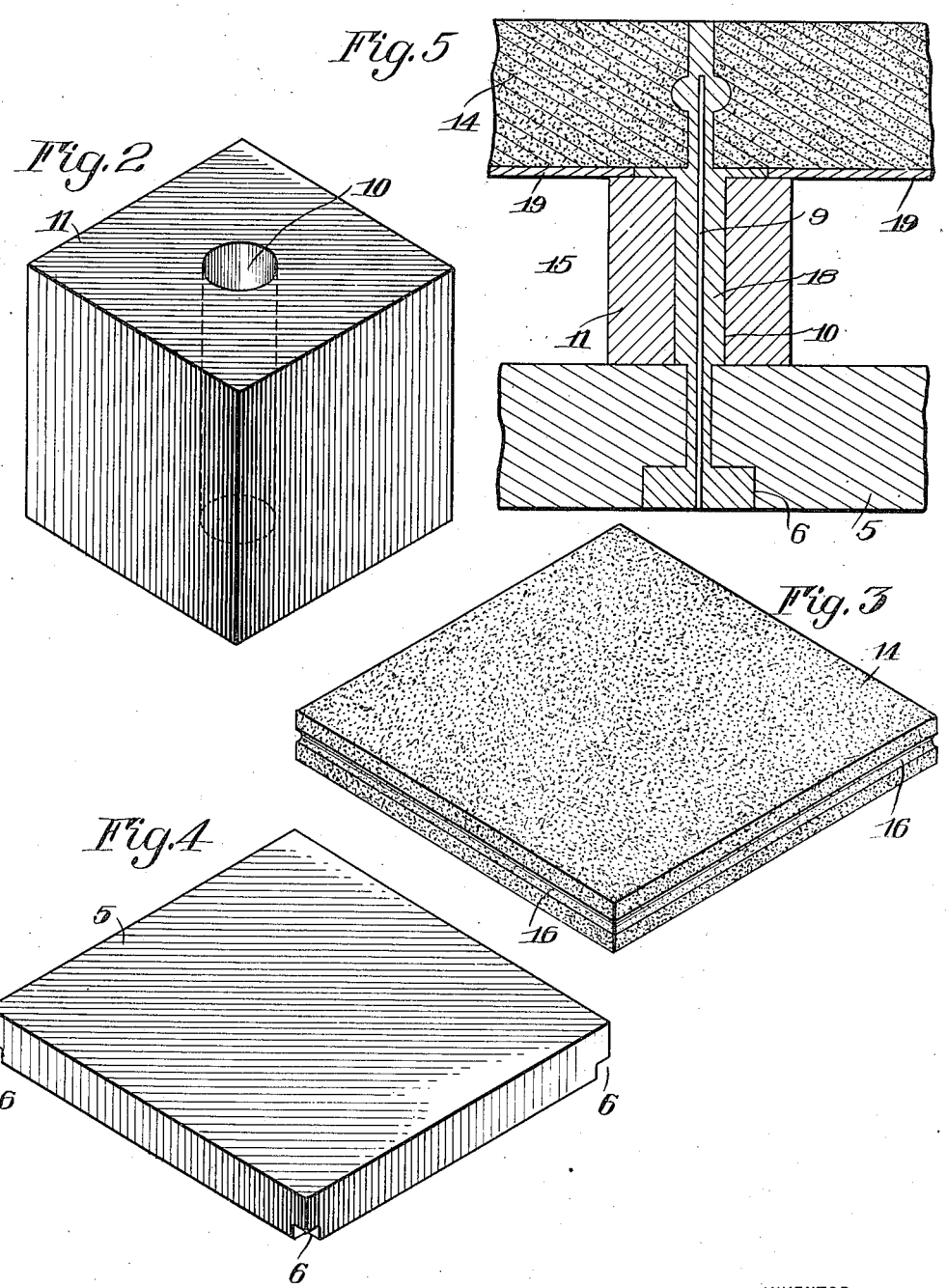
WITNESSES:
INVENTOR
Walter R. Beckley
BY
his ATTORNEYS

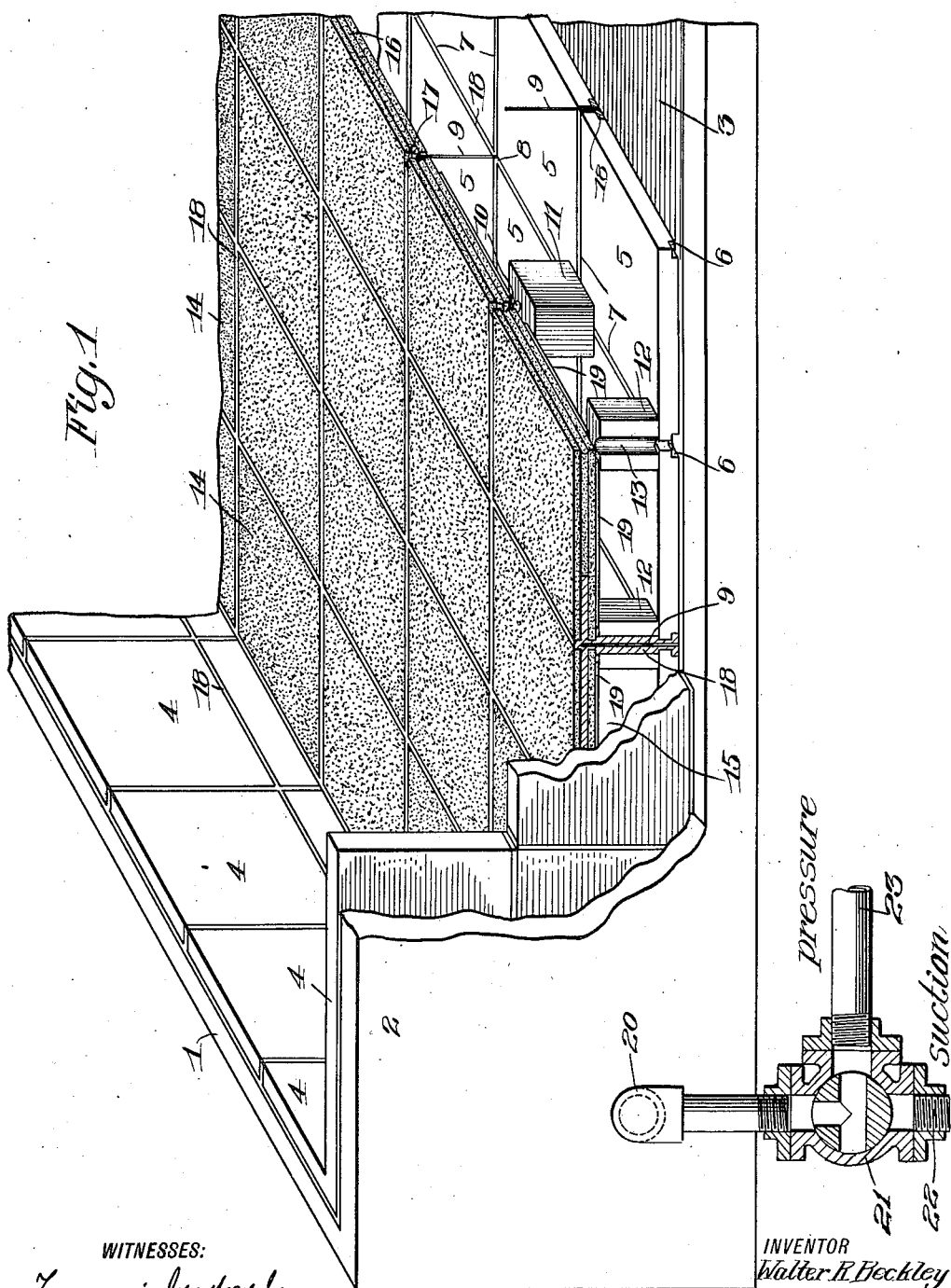

UNITED STATES PATENT OFFICE.

WALTER R. BECKLEY, OF ROCHESTER, NEW YORK, ASSIGNOR TO GENERAL FILTRATION COMPAY, INC., OF ROCHESTER, NEW YORK, A CORPORATION OF NEW YORK.

CHEMICAL-FILTER.

1,277,832.   Specification of Letters Patent.   Patented Sept. 3, 1918.

Application filed December 27, 1915. Serial No. 68,891.

*To all whom it may concern:*

Be it known that I, WALTER R. BECKLEY, of Rochester, in the county of Monroe and State of New York, have invented certain new and useful Improvements in Chemical-Filters; and I do hereby declare the following to be a full, clear, and exact description of the same, reference being had to the accompanying drawings, forming a part of this specification, and to the reference-numerals marked thereon.

My present invention relates to the construction of filters and is designed especially with reference to the filtration of chemicals and particularly with respect to those acids which attack metals and other materials in their various forms of construction.

One of the principal objects of my invention is to provide a filter capable of resisting the action of acids or other solutions tending to injuriously affect certain materials.

A further object of my invention is to provide, in the construction of a filter, means whereby the pressure and suction principle may be employed to assist in the filtering operation of liquids and solutions through a filtering medium and of removing therefrom the accumulating insoluble solids.

A still further object of the invention is to provide means for connecting a series of spaced acid proof members with a suitable acid proof binding to form the bottom and side walls of an acid holding tank. A still further object of the invention is to provide means for securing and interlocking above an acid proof tank bottom, a series of uniformly constructed acid proof filtering mediums capable of properly filtering acid solutions of various kinds. To these and other ends the invention consists in certain improvements and combinations of parts all as will be hereinafter more fully described, the novel features being pointed out in the claims at the end of the specification.

In the drawings:

Figure 1 is a view in perspective of a portion of a tank showing the manner of assembling and connecting the members forming the acid proof bottom and side walls and also the manner of supporting and connecting the members adapted to form a filtering bed spaced above the acid proof bottom;

Fig. 2 is a detail perspective view of one of the supporting blocks or columns upon which the filtering plates are positioned;

Fig. 3 is a detail perspective view of one of the filtering plates as shown in Fig. 1;

Fig. 4 is a detail view in perspective of one of the acid proof base plates, and Fig. 5 is an enlarged sectional view through the filtering and base plates at the point where the former is supported upon the latter by one of the supporting blocks shown in Fig. 2.

Similar reference numerals throughout the several figures indicate the same parts.

In carrying out my invention I preferably provide a rectangular tank having side and end walls 1 and 2 and a bottom 3, all of which may be formed of concrete or any other suitable material. The side and end walls are lined with any suitable acid proof lining material 4, preferably in the form of rectangular blocks or slabs between the sides or edges of which an acid proof cement binding is placed for the purpose of tying the blocks together and rendering the walls impervious to the acid intended to be filtered through the tank. Upon the bottom of the tank I position the acid proof base plates or tilting members 5, shown in detail in Fig. 4, the corners of the members at the bottom edges thereof having under-cut portions formed as indicated at 6, to constitute spaces to be filled with cement adapted to tie the base plates to a filtering bed in a manner which will be hereinafter described. I preferably arrange the plates upon the tank bottom so that there will be a slight space between the edges of the adjacent members, as shown at 7 in Fig. 1. At the intersecting points 8 of the spaces 7 formed between the acid proof plates 5 I insert upstanding reinforcing rods 9, which are adapted to extend through openings 10 formed in the acid proof supporting blocks or columns 11 positioned on the base plates at the points where the corners of the plates meet, as clearly shown in Figs. 1 and 5. Also where the corners of the base plates meet and abut the side walls of the tank I provide supporting blocks or columns 12 with grooves or openings 13 formed in the outer faces of the blocks to receive the reinforcing rods 9 as shown in Fig. 1. The acid proof columns and base plates may be formed of any suitable acid resisting material which it may be found desirable to use. A series of filtering plates 14 which may be formed of any suitable acid resisting porous material are adapted to be positioned upon and supported by the columns 11 and 12 in spaced relation to the base plates 5 so that an acid receiving chamber 15 is formed in the bottom of the tank between the base plates and the filtering plates. The filtering plates are provided preferably with connecting grooves or keyways 16 formed in the four sides thereof in the manner shown in Figs. 1 and 3. In positioning the filtering plates upon the supporting columns I arrange them so that all of the columns 11 are adapted to support one corner each of four different filtering plates in the manner shown in Fig. 1. Instead of abutting the edges of the plates I preferably space them a little apart so that there will be continuous connecting spaces 17 around each plate, and the spaces running longitudinally of the tank will intersect the transverse spaces centrally of the supporting columns, thereby causing said spaces to connect with the openings 10 formed in the columns, and also the spaces 7 and undercuts 6 of the acid proof base plates. The reinforcing rods 9 are adapted to extend from the bottom of the base plates through the columns nearly to the top of the filtering plates at the intersection of the spaces therebetween as shown in Fig. 5. The rods however, do not fill the openings 10 formed in the columns, sufficient room being left for the cement to produce therein a strong tie connecting the base and filter plates together. After the filtering plates have all been properly arranged upon the supporting columns a thin binding of acid proof cement indicated at 18 may be run between the plates until all of the pockets 6 and spaces 7 between the base plates, the openings 10 in the columns, the grooves or keyways 16 and the spaces 17 around the filtering plates are filled level with the top of the filtering bed, which is arranged below the top of the tank. When the acid proof cement has hardened the base plates and the filtering plates will be bound together in such a way as to produce a unitary structure of great strength, locked against up and down movement and forming beds with substantially smooth surfaces free from projections or obstructions of any kind. A smooth filtering bed is particularly essential in a filter of this type in order that the solid material accumulating on the surface of the bed may be scraped off with the least possible resistance in the use of the scraping tool and it is for this reason that I have arranged the plates so that there are no projections extending above the surface of the bed to interfere with the cleaning thereof. In order to provide means for preventing the escape of the liquid cement through the spaces or openings 17 formed between the filtering plates I position beneath the openings thin strips 19 preferably formed of wood, the ends of the strips being adapted to rest upon the supporting columns in the manner shown in Figs. 1 and 5. Through the side walls of the tank and opening into the acid receiving chamber 15 I provide suction passages or conduits to which any suitable suction apparatus (shown in part in Fig. 1), may be connected as indicated at 20, whereby when the tank is filled with acid or other substances to be filtered and suction is applied through the valve 21 and pipe 22, filtration through the porous bed is thereby greatly aided and means provided for removing the filtered acid from the chamber 15. For the loosening or removal from the pores of the filtering plates or from the surfaces of the plates of such solid substances as may accumulate therein or upon the filtering bed in the process of filtration, pressure may be applied beneath the bed through the pipe 23, valve 21 and connection 20 by any pressure producing apparatus suitable for this purpose. The pressure will of course be substantially the same against the base plates and the lower surface of the filtering plates, the filtering plates being held against upward movement by the cement and rod 9 in the supporting columns connecting the base and the filter plates together and by the interlocking cement between the various filter plates.

While I have described in detail the construction of certain parts of my invention it will be evident of course, that the formation of the parts may be varied to a certain degree without departing from the spirit of the invention and I, therefore, do not limit myself to the particular construction shown. Also while my invention is particularly adapted for the filtration of chemical solutions, it will be obvious that it may readily be used in the filtering of other substances as well.

I claim as my invention:

1. A filter comprising a receptacle having a bottom and side walls, said bottom being formed of a series of plates arranged in spaced relation to each other to form openings therebetween, a bed comprising a system of filtering plates arranged in spaced relation to each other to form openings therebetween, means supporting said filtering plates provided with openings communicating with the openings between said bottom plates and said filtering plates and binding material filling all of said openings.

2. A filter having a bottom and side walls connecting therewith, a bed comprising a series of filtering members spaced from said bottom and provided with keyways in their adjacent edges, and a filling material in said keyways forming a key for connecting said filtering members.

3. A filter having a bottom and side walls connecting therewith, a bed arranged in spaced relation to the bottom and comprising a series of filtering plates provided with grooves in their edges, the grooves of one plate being arranged opposite the grooves of the adjacent plates and a filling material in said grooves forming a connection between said filtering plates.

4. A filter having side walls and a bottom formed of members spaced to provide openings therebetween, a filtering bed spaced from said bottom comprising filtering members with grooves formed in the edges thereof, means for supporting said filtering members upon said bottom provided with openings connecting with the openings between the bottom members and said grooves, and a binding material adapted to fill all of said openings and said grooves.

5. A filter having side walls and a bottom comprising members provided with undercut portions, the members being spaced apart to form openings therebetween, a filter bed located above said bottom comprising a series of members having grooves in their edges, means for supporting the filtering members having openings formed therein, and a binding material filling all of said grooves and openings and said undercuts and serving to connect the members constituting said bottom and said bed.

6. A filter comprising a receptacle having a bottom and side walls connected therewith, said bottom being formed of a series of plates arranged in spaced relation to each other to form openings therebetween, a bed comprising a system of filtering plates arranged in spaced relation to each other to form openings therebetween, supporting members mounted on said bottom and adapted to support said filtering plates in spaced relation to the bottom and provided with openings connecting with the opening between said bottom plates and said filtering plates, reinforcing members positioned in the openings formed through said supporting members to partially fill the same and extending into the openings formed between the filtering plates, and a binding material filling the openings in the supporting members around the reinforcing members and the openings formed between said bottom plates and said filtering plates.

7. A filter comprising a receptacle having a bottom and side walls, the bottom consisting of a series of plates having undercut portions formed therein, a bed comprising a system of filtering plates provided with openings formed in the edges thereof, supporting members for the bed mounted on said bottom having openings communicating with the undercuts in the first mentioned plates and the openings in the filtering plates, a binding material filling the undercut portions and the openings in the supporting members and filtering plates for the purpose of forming a tie between the bottom plates and the filtering plates, and means whereby pressure and suction may be alternately applied between the bottom and the bed.

8. A filtering receptacle having a bottom and side walls connecting therewith, a filtering bed spaced above said bottom comprising a system of adjacent filtering plates arranged to form a substantially level surface, supports for the plates, and reinforced binding material connecting the supports with the plates and the plates with each other.

9. A filtering receptacle comprising side walls and a bottom formed of plates provided with undercut portions, a filtering bed spaced above said bottom comprising a system of filtering plates having grooves formed in their edges, a series of supporting members positioned beneath the plates at the intersection of the sides thereof and provided with openings connecting with the undercut portions and the grooves and a binding material filling said openings and grooves and said undercut portions.

10. In a filter, a tank having a bottom and side walls, a filtering bed formed of a series of filtering members arranged above said bottom, spaced members mounted on the bottom and adapted to support the filtering members, means whereby pressure may be applied between the bottom and the filtering members and means connecting the bottom with the filtering members through the spaced supporting members for the purpose of preventing upward displacement of the filtering members by said pressure.

11. In a filter, a tank having a bottom and side walls, a filtering bed arranged above said bottom, spaced members mounted on the bottom and adapted to support the filtering bed, means whereby equal pressure may be applied on the bottom and the under surface of the bed, and means carried by the spaced members connecting the bottom and the bed for the purpose of preventing displacement of the latter by said pressure.

12. A filtering receptacle having a bed positioned therein above the bottom thereof comprising adjacently mounted filtering plates and independent supporting members upon the bottom of the receptacle projecting upwardly beneath the plates at the adjacent corners thereof, each of said members being arranged to carry a portion of the weight of all of the plates, the corners of which terminate at a point thereabove.

WALTER R. BECKLEY.

Witnesses:
J. N. BECKLEY,
F. E. LEIBY.